(12) United States Patent
Ren et al.

(10) Patent No.: US 11,960,034 B2
(45) Date of Patent: Apr. 16, 2024

(54) THREE-DIMENSIONAL TOWERED CHECKERBOARD FOR MULTI-SENSOR CALIBRATION, AND LIDAR AND CAMERA JOINT CALIBRATION METHOD BASED ON THE CHECKERBOARD

(71) Applicant: NANJING UNIVERSITY OF SCIENCE AND TECHNOLOGY, Suzhou (CN)

(72) Inventors: Dexin Ren, Suzhou (CN); Mingwu Ren, Suzhou (CN)

(73) Assignee: NANJING UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/296,382

(22) Filed: Apr. 6, 2023

(65) Prior Publication Data

US 2023/0251363 A1 Aug. 10, 2023

Related U.S. Application Data

(63) Continuation-in-part of application No. PCT/CN2022/101476, filed on Jun. 27, 2022.

(30) Foreign Application Priority Data

Nov. 8, 2021 (CN) .......................... 202111315327.4
Nov. 8, 2021 (CN) .......................... 202122717165.9

(51) Int. Cl.
*G01S 7/497* (2006.01)
*G01S 17/86* (2020.01)
*G06T 7/33* (2017.01)
*G06T 7/80* (2017.01)

(52) U.S. Cl.
CPC .............. *G01S 7/497* (2013.01); *G01S 17/86* (2020.01); *G06T 7/33* (2017.01); *G06T 7/80* (2017.01);

(Continued)

(58) Field of Classification Search
None
See application file for complete search history.

(56) References Cited

U.S. PATENT DOCUMENTS

2021/0146942 A1* 5/2021 Hrabe ................. G01S 7/497
2021/0316669 A1* 10/2021 Wang ................. G01S 7/4086
2022/0092819 A1 3/2022 Jiang et al.

FOREIGN PATENT DOCUMENTS

CN 110660107 1/2020
CN 111429532 7/2020
(Continued)

OTHER PUBLICATIONS

"International Search Report (Form PCT/ISA/210) of PCT/CN2022/101476," dated Sep. 1, 2022, pp. 1-4.
(Continued)

Primary Examiner — Luke D Ratcliffe
(74) Attorney, Agent, or Firm — JCIPRNET

(57) ABSTRACT

The disclosure is a three-dimensional towered checkerboard for multi-sensor calibration, and a LiDAR and camera joint calibration method based on the checkerboard. The joint calibration method includes: establishing a modeling coordinate system taking the three-dimensional towered checkerboard as a basis, and generating a point cloud of the three-dimensional towered checkerboard; denoising a three-dimensional point cloud obtained by LiDAR, and obtaining an actual point cloud of the three-dimensional towered checkerboard under a LiDAR coordinate system; determining a transformation relationship between the LiDAR coordinate system and the modeling coordinate system; generating a corner point set of two-dimensional checkerboards under the modeling coordinate system in sequence according to actual positions of corners of the two-dimensional checkerboards, and transforming into the LiDAR coordinate system; obtaining a corner point set of the two-dimensional checkerboards on a photo; and calculating a transformation relationship between the camera coordinate system and the LiDAR coordinate system.

8 Claims, 13 Drawing Sheets

(52) U.S. Cl.
    CPC .............. *G06T 2207/10028* (2013.01); *G06T 2207/20164* (2013.01); *G06T 2207/30244* (2013.01)

(56) References Cited

FOREIGN PATENT DOCUMENTS

| | | | |
|---|---|---|---|
| CN | 111815716 A | * | 10/2020 |
| CN | 112132906 | | 12/2020 |
| CN | 112669393 | | 4/2021 |
| CN | 112669393 | | 10/2021 |
| CN | 113902812 A | * | 1/2022 |
| CN | 216211122 | | 4/2022 |
| KR | 20210116161 | | 9/2021 |
| WO | 2021182793 | | 9/2021 |

OTHER PUBLICATIONS

"Written Opinion of the International Searching Authority (Form PCT/ISA/237) of PCT/CN2022/101476," dated Sep. 1, 2022, with English translation thereof, pp. 1-10.

Shi Jiahao et al., "Camera calibration method based on 3D calibration plate," Transducer and Microsystem Technologies, vol. 40, Jun. 2021, pp. 48-51.

Yan Wang, "Study on Camera Calibration Error for Rail Profile Vision Measurement Based on Pin-plate Target," 2018 IEEE 4th Information Technology and Mechatronics Engineering Conference (ITOEC), Jun. 2019, pp. 1644-1647.

\* cited by examiner

THREE-DIMENSIONAL TOWERED CHECKERBOARD FOR MULTI-SENSOR CALIBRATION, AND LIDAR AND CAMERA JOINT CALIBRATION METHOD BASED ON THE CHECKERBOARD

CROSS-REFERENCE TO RELATED APPLICATION

This application is a continuation-in-part of international application of PCT application serial no. PCT/CN2022/101476, filed on Jun. 27, 2022, which claims the priority benefit of China application no. 202111315327.4, filed on Nov. 8, 2021, and the priority benefit of China application no. 202122717165.9, filed on Nov. 8, 2021. The entirety of each of the abovementioned patent applications is hereby incorporated by reference herein and made a part of this specification.

TECHNICAL FIELD

This application relates to the technical field of checkerboards for multi-sensor calibration, and particularly to a three-dimensional towered checkerboard for multi-sensor calibration, and a light detection and ranging (LiDAR) and camera joint calibration method based on the checkerboard.

BACKGROUND TECHNIQUE

In the prior art, checkerboard calibration plates are two-dimensional checkerboards for the Zhengyou Zhang's calibration method. Two-dimensional checkerboard calibration plates are all planar structures and mainly used for intrinsic calibration of cameras.

Moreover, the two-dimensional checkerboards are also usually used for joint calibration of extrinsic parameters, for example, joint calibration of extrinsic parameters between the LiDAR and cameras. However, in these methods, as a calibration plate point cloud obtained by a LiDAR merely has planar features, a direct correspondence with corners obtained by a camera cannot be obtained, that is, direct points corresponding to the corners of the camera cannot be determined from the point cloud. This error is particularly obvious when LiDAR beams are relatively sparse. Therefore, using the two-dimensional checkerboard calibration plates has a problem of inaccuracy caused by misalignment between a LiDAR perceived plane and camera perceived corners, and problems such as inconvenience to use caused by the requirement for multiple frames of data of the checkerboard calibration plates.

In terms of unmanned driving, robot navigation and other fields, environment perception and modeling usually adopt a multi-sensor data fusion technology, to obtain a more reliable, uniform, and detailed description of the environment, which facilitates navigation positioning, behavior decisions and planning control. Besides, a video camera and a LiDAR are main sensors, and distance information provided by the LiDAR and color information provided by the video camera have strong complementarity, so that fusing these two types of information has become a research hotspot today. Moreover, to implement data fusion in multiple levels and accurate matching between camera image data and LiDAR point cloud data, the first step to be done is joint calibration therebetween, that is, obtaining an accurate coordinate transformation relationship between the camera and the LiDAR, or calculating an extrinsic matrix of the camera and the LiDAR.

Extrinsic parameter calibration between the LiDAR and the video camera usually requires calibrators to provide accurate geometric dimension information. These calibrators are usually placed in a scene in a calibration stage, and a correspondence between features is built in the obtained video camera image and LiDAR point cloud data.

However, in a conventional joint calibration process, the two-dimensional checkerboard calibration plates are generally used, and then a point cloud image obtained by scanning of the LiDAR is matched with corners of a checkerboard image obtained by the camera to obtain extrinsic parameters. In this way, as a two-dimensional checkerboard point cloud obtained by the LiDAR merely has planar features, a direct correspondence with corners obtained by the camera cannot be obtained, that is, direct points corresponding to the corners of the camera cannot be determined from the point cloud. This error is particularly obvious when LiDAR beams are relatively sparse. Moreover, this method generally requires acquiring multiple frames of LiDAR point clouds and camera images from different angles to perform fitting in three dimensions, which leads to great errors and also troubles in manual operation. Therefore, how to simply and accurately calculate an extrinsic relationship for joint calibration between a camera and a LiDAR is particularly important.

SUMMARY

The technical problem to be solved by the present invention is: to provide a three-dimensional towered checkerboard for multi-sensor calibration, and a LiDAR and camera joint calibration method based on the checkerboard, capable of solving the technical problem of being unable to perform three-dimensional calibration in joint calibration.

In a first aspect, embodiments of the present invention provide a three-dimensional towered checkerboard for multi-sensor calibration. The three-dimensional towered checkerboard is formed by stacking a plurality of polyhedrons with a same shape; the polyhedrons are structures formed by cubes with three adjacent surfaces combined together at a same vertex; the three-surface connected to a protruding vertex of any polyhedron are respectively considered as surface X, surface Y, and surface Z;

orientations and normal vectors of surfaces X of all polyhedrons are the same, orientations and normal vectors of surfaces Y of all polyhedrons are the same, and orientations and normal vectors of surfaces Z of all polyhedrons are the same; the polyhedrons are sequentially stacked next to each other to form a multilayer structure;

in any layer, starting from an outermost polyhedron, surfaces X of every two adjacent polyhedrons are sequentially separated by a preset distance in a direction of the normal vectors of surfaces X; moreover, surfaces Y of every two adjacent polyhedrons are sequentially separated by the preset distance in a direction of the normal vectors of surfaces Y; the preset distance is the distance of the edge length of the cube;

starting from the top end or the bottom end, surfaces Z of every two adjacent polyhedrons are sequentially separated by the preset distance in a direction of the normal vectors of surfaces Z; and the three-dimensional towered checkerboard is covered with two-dimensional checkerboards at the predetermined positions.

In a preferred embodiment, the three-dimensional towered checkerboard is at least of a three-layer structure.

In a preferred embodiment, the two-dimensional checkerboard is a calibration plate formed by arranging black squares and white squares alternately in a checkerboard mode;

an edge length of the two-dimensional checkerboard is shorter than that of the polyhedron.

In a preferred embodiment, surfaces X, Y and Z of all the polyhedrons are all provided with the two-dimensional checkerboards.

In a preferred embodiment, surfaces X, Y or Z of the polyhedrons of multiple layers or multiple columns are all provided with the two-dimensional checkerboards.

In a preferred embodiment, any adjacent polyhedrons are connected by means of an adhesive or a screw.

In a preferred embodiment, surfaces X and Y are vertical planes, while surfaces Z are horizontal surfaces.

In a second aspect, the embodiments of the present invention further provide a LiDAR and camera joint calibration method based on a three-dimensional towered checkerboard. The method is based on the three-dimensional towered checkerboard. The three-dimensional towered checkerboard is a multilayer structure formed by stacking a plurality of cubes, and an orientation of each cube is the same; planes, having a uniform orientation, of the cubes on each layer are provided with two-dimensional checkerboards; an edge length of the two-dimensional checkerboard is less than that of the cube;

the method comprises:
  establishing a modeling coordinate system taking the three-dimensional towered checkerboard as a basis, and generating a simulated point cloud of the three-dimensional towered checkerboard;
  denoising a three-dimensional point cloud obtained by LiDAR, and obtaining an actual point cloud of the three-dimensional towered checkerboard under a LiDAR coordinate system;
  determining a transformation relationship between the LiDAR coordinate system and the modeling coordinate system according to the simulated point cloud and the actual point cloud;
  generating a corner point set in sequence according to the actual positions of corners of the two-dimensional checkerboards on the three-dimensional towered checkerboard in the modeling coordinate system;
  transforming the corner point set into the LiDAR coordinate system according to the transformation relationship between the LiDAR coordinate system and the modeling coordinate system;
  searching for the corners of the two-dimensional checkerboards by using a photo of the three-dimensional towered checkerboard captured by a camera, and obtaining the corner point set of the two-dimensional checkerboards on the photo; and
  determining a transformation relationship between a camera coordinate system and the LiDAR coordinate system according to the corner point set under the LiDAR coordinate system and the corner point set under the two-dimensional checkerboard; the transformation relationship between the camera coordinate system and the LiDAR coordinate system being a joint calibration result.

In a preferred embodiment, the establishing a modeling coordinate system taking the three-dimensional towered checkerboard as a basis, and generating a simulated point cloud of the three-dimensional towered checkerboard includes:

by taking a bottom left protrusion of the three-dimensional towered checkerboard as an origin, along a distribution direction of the three-dimensional towered checkerboard, respectively establishing an x-axis, a y-axis and a z-axis, to establish the modeling coordinate system; and generating the simulated point cloud of the three-dimensional towered checkerboard under the modeling coordinate system according to structure information of the three-dimensional towered checkerboard, with a point spacing of the simulated point cloud being less than 1 mm.

In a preferred embodiment, the denoising a three-dimensional point cloud obtained by LiDAR, and obtaining an actual point cloud of the three-dimensional towered checkerboard under a LiDAR coordinate system includes:
  removing points of the three-dimensional towered checkerboard on the ground and in an uncorrelated interval according to an interval where the three-dimensional towered checkerboard is located;
  fitting the ground plane where the three-dimensional towered checkerboard is located, and removing all the points on the ground plane; the ground plane is a plane having the largest number of points in a space of the three-dimensional towered checkerboard and having a normal vector which goes approximately vertically upward; and
  taking the three-dimensional point cloud after all the points on the ground plane and in the uncorrelated interval are removed as the actual point cloud of the three-dimensional towered checkerboard under the LiDAR coordinate system.

In a preferred embodiment, the determining a transformation relationship between the LiDAR coordinate system and the modeling coordinate system according to the simulated point cloud and the actual point cloud includes:
  performing, by using an iterative closest point algorithm, three-dimensional point cloud registration on the simulated point cloud generated under the modeling coordinate system and the actual point cloud of the three-dimensional towered checkerboard under the LiDAR coordinate system, and determining the transformation relationship between the LiDAR coordinate system and the modeling coordinate system.

In a preferred embodiment, the generating a corner point set in sequence according to the actual positions of corners of the two-dimensional checkerboards on the three-dimensional towered checkerboard in the modeling coordinate system includes:
  numbering the two-dimensional checkerboards according to a predetermined sequence; and
  generating the corner point set on the basis of the serial numbers, in a sequence from smallest to largest, and according to the predetermined sequence.

In a preferred embodiment, the transforming the corner point set into the LiDAR coordinate system according to the transformation relationship between the LiDAR coordinate system and the modeling coordinate system includes:
  a calculation method for the corner point set under the LiDAR coordinate system:

$$S_L = F_{L-M} * S_M$$

in the equation, $S_L$ is the corner point set under the LiDAR coordinate system, $F_{L-M}$ is the transformation relationship between the LiDAR coordinate system and the modeling coordinate system, and $S_M$ is the corner point set generated under the modeling coordinate system.

In a preferred embodiment, the searching for the corners of the two-dimensional checkerboards by using a photo of the three-dimensional towered checkerboard captured by a camera, and obtaining the corner point set of the two-dimensional checkerboards on the photo includes:

sequentially obtaining the target checkerboard areas having consistent lengths and widths as the two-dimensional checkerboards from the photo of the three-dimensional towered checkerboard;

every time a group of target checkerboard areas is obtained, setting the target checkerboard areas black until the photo of the three-dimensional towered checkerboard does not contain the target checkerboard area; and arranging the checkerboard corners in all the target checkerboard areas from left to right and from top to bottom, to obtain the corner point set of the two-dimensional checkerboards on the photo.

In a preferred embodiment, the determining a transformation relationship between a camera coordinate system and the LiDAR coordinate system according to the corner point set under the LiDAR coordinate system and the corner point set under the two-dimensional checkerboard comprises:

performing, by using a perspective-n-point positioning method, camera pose measurement and matching on the corner point set under the LiDAR coordinate system and the corner point set obtained from the photo, and according to camera intrinsic and distortion parameters, determining the transformation relationship between the camera coordinate system and the LiDAR coordinate system.

The beneficial effects are as follows: in one three-dimensional towered checkerboard in this application, n polyhedrons are designed in each layer, m layers are designed, and the layers are staggered. The number n of polyhedrons in each layer does not have to be the same, and two-dimensional checkerboards are attached to several fixed polyhedrons. This application converts the problem of planar point clouds perceived by a LiDAR into a three-dimensional point cloud problem. As corners of a three-dimensional point cloud have accurate uniqueness, they are matched with corners obtained by photographing the two-dimensional checkerboards via camera, so that extrinsic parameters for calibration of the camera and the LiDAR are accurately obtained. Due to large amounts of information carried by a multi-level tower structure and a plurality of two-dimensional checkerboard calibration plates, an extrinsic result can be accurately obtained by merely one photographing. The design saves time and efforts while accurately realizing joint calibration between a LiDAR and a camera. In addition, on the basis of stereospecificity of the three-dimensional towered checkerboard, this application solves the problem of inaccuracy of matching of a planar point cloud obtained by a LiDAR when conventional two-dimensional checkerboards are used, and also solves the problem of complicated manual operations caused by a plurality of image frames in a conventional method. This application implements combination by two transformation relationships between coordinate systems, thereby accurately obtaining an extrinsic matrix between a LiDAR and a camera.

DESCRIPTION OF THE EMBODIMENTS

To make objectives, technical solutions, and advantages of this application clearer, the following further describes implementations of this application in detail with reference to the accompanying drawings.

Figure 1:
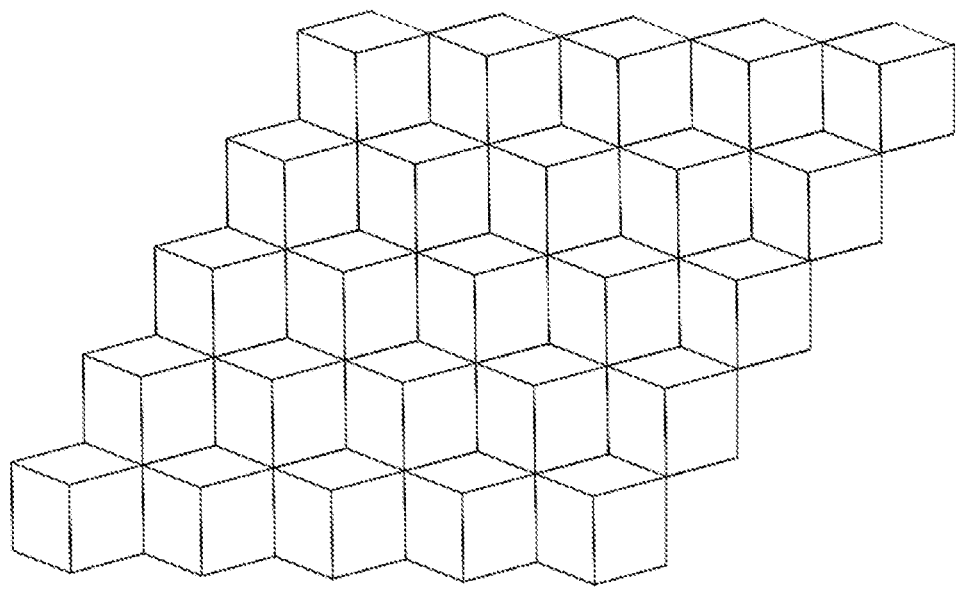
FIG. 1 is a schematic structural diagram of a three-dimensional towered checkerboard according to an embodiment of this application.

FIG. 1 is a schematic structural diagram of a three-dimensional towered checkerboard according to an embodiment of this application.

The three-dimensional towered checkerboard is formed by stacking a plurality of polyhedrons having a same shape; the polyhedrons are structures formed by cubes with three adjacent surfaces combined together at a same vertex;

the three surfaces connected to a vertex of any polyhedron are respectively considered as surface X, surface Y, and surface Z;

orientations and normal vectors of surfaces X of all polyhedrons are the same, orientations and normal vectors of surfaces Y of all polyhedrons are the same, and orientations and normal vectors of surfaces Z of all polyhedrons are the same; surfaces X and Y are vertical planes, while surfaces Z are horizontal surfaces;

the polyhedrons are sequentially stacked next to each other to form a multilayer structure;

in any layer, starting from an outermost polyhedron, surfaces X of every two adjacent polyhedrons are sequentially separated by a preset distance in a direction of the normal vectors of surfaces X; Moreover, surfaces Y of every two adjacent polyhedrons are sequentially separated by the preset distance in a direction of the normal vectors of surfaces Y; the preset distance is the distance of the edge length of the cube;

starting from the top end or the bottom end, surfaces Z of every two adjacent polyhedrons are sequentially separated by the preset distance in a direction of the normal vectors of surfaces Z;

the three-dimensional towered checkerboard is covered with two-dimensional checkerboards at the predetermined positions.

The three-dimensional towered checkerboard is at least of a three-layer structure. In an embodiment of this application, the polyhedrons are fixed to each other by adopting a plurality of connection modes.

Any adjacent polyhedrons are connected by means of an adhesive or a screw.

Figure 2:
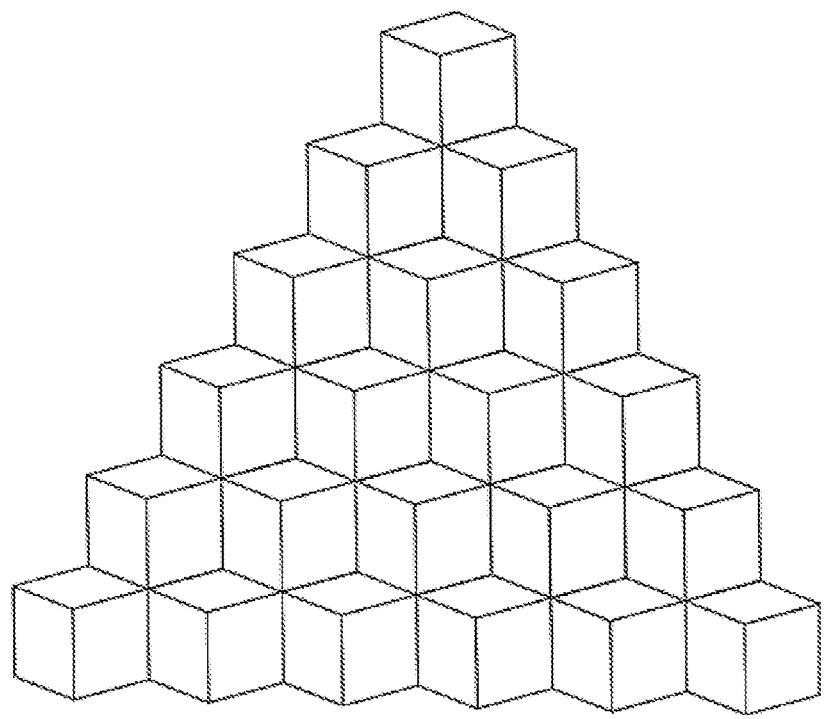
FIG. 2 is a schematic structural diagram of another three-dimensional towered checkerboard according to an embodiment of this application.

FIG. 2 is a schematic structural diagram of another three-dimensional towered checkerboard according to an embodiment of this application. In the drawing, the number of polyhedrons in each layer is different.

the three-dimensional towered checkerboard is covered with two-dimensional checkerboards at the predetermined positions.

Figure 3:
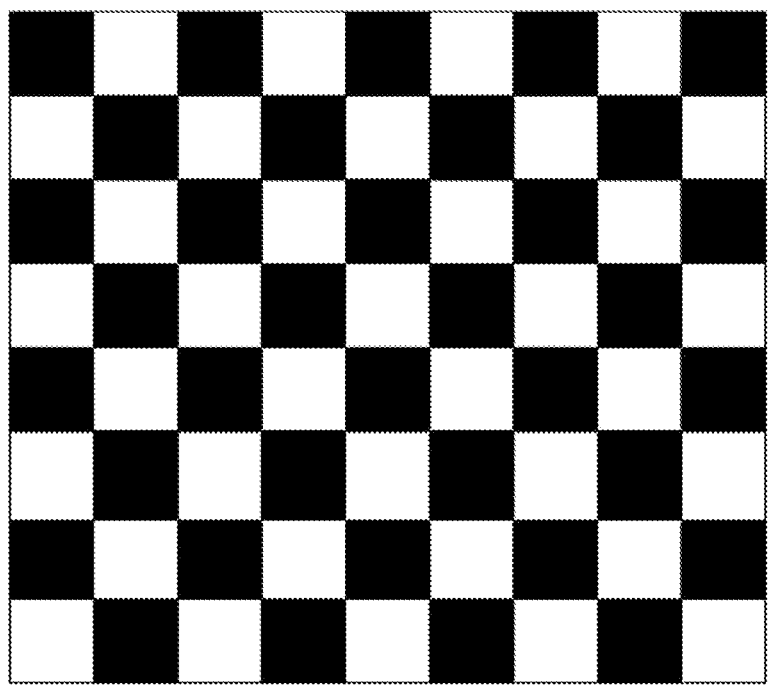
FIG. 3 is a schematic structural diagram of a two-dimensional checkerboard according to an embodiment of this application.

FIG. 3 is a schematic structural diagram of a two-dimensional checkerboard according to an embodiment of this application.

In an embodiment of this application, the two-dimensional checkerboard is a calibration plate formed by arranging black squares and white squares alternately in a checkerboard mode.

An edge length of the two-dimensional checkerboard is shorter than that of the polyhedron.

In an embodiment of this application, the two-dimensional checkerboards are set in a plurality of modes. One of the setting modes is that surfaces X, Y and Z of all the polyhedrons are all provided with the two-dimensional checkerboards.

Another possible setting mode is that surfaces X, Y or Z of the polyhedrons of multiple layers or multiple columns are all provided with the two-dimensional checkerboards. That is, the two-dimensional checkerboards are provided on all surfaces with a same orientation of the polyhedrons in a same layer, or a same row, or a same column of the three-dimensional towered checkerboard.

It should be noted that in the embodiments of this application, the two-dimensional checkerboards are set in a plurality of modes. In this application, merely some of the setting modes are listed. Checkerboards may be provided on all the surfaces of the polyhedrons, or may also be provided on any one surface. Any setting method in the interval therebetween falls within the scope of protection of this application.

The three-dimensional towered checkerboard provided by this application is further described below with reference to the following three embodiments.

Embodiment 1

Figure 4:
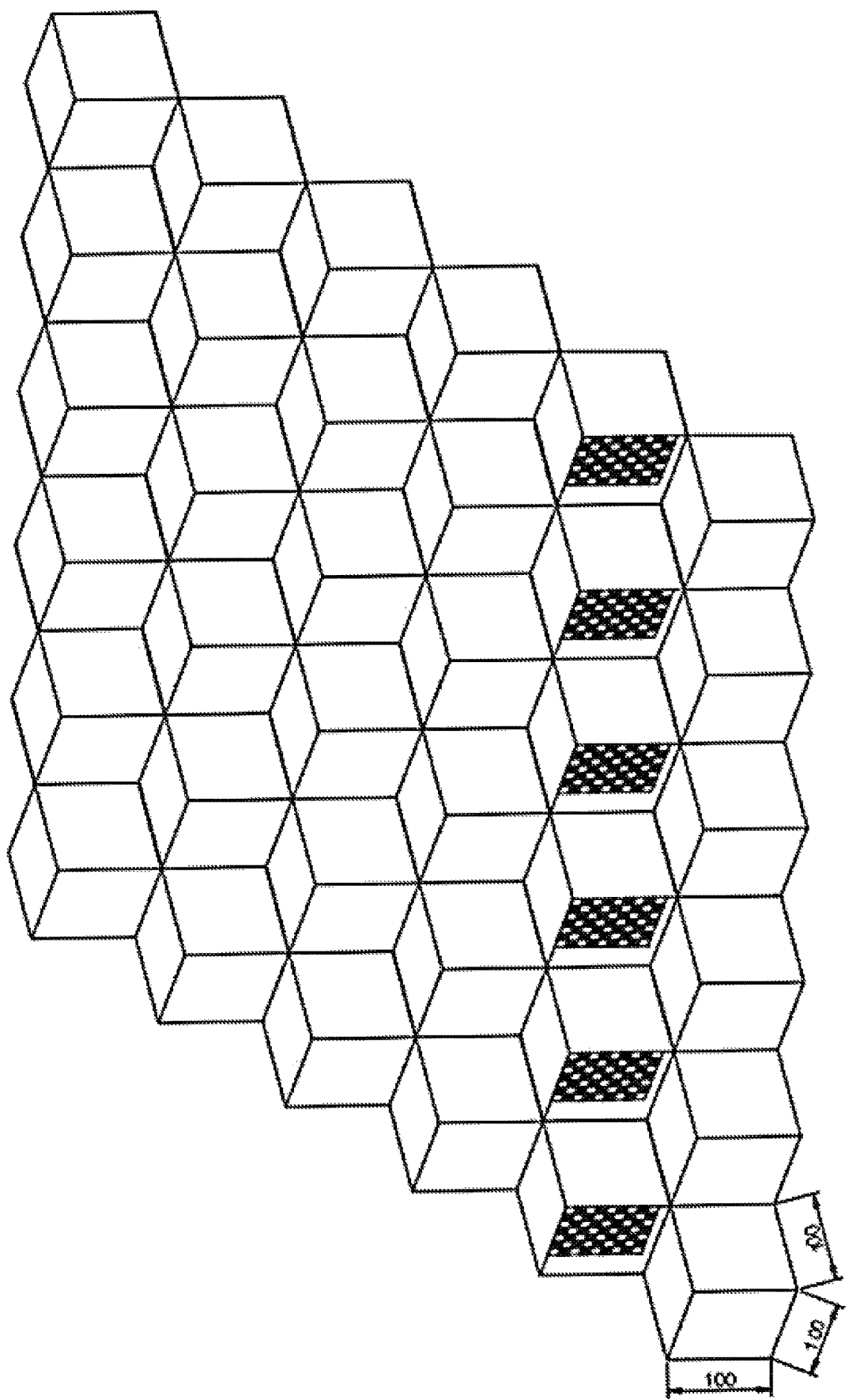
FIG. 4 is a first example diagram of a three-dimensional towered checkerboard according to an embodiment of this application.

FIG. 4 is a first example diagram of a three-dimensional towered checkerboard according to an embodiment of this application.

Figure 5:
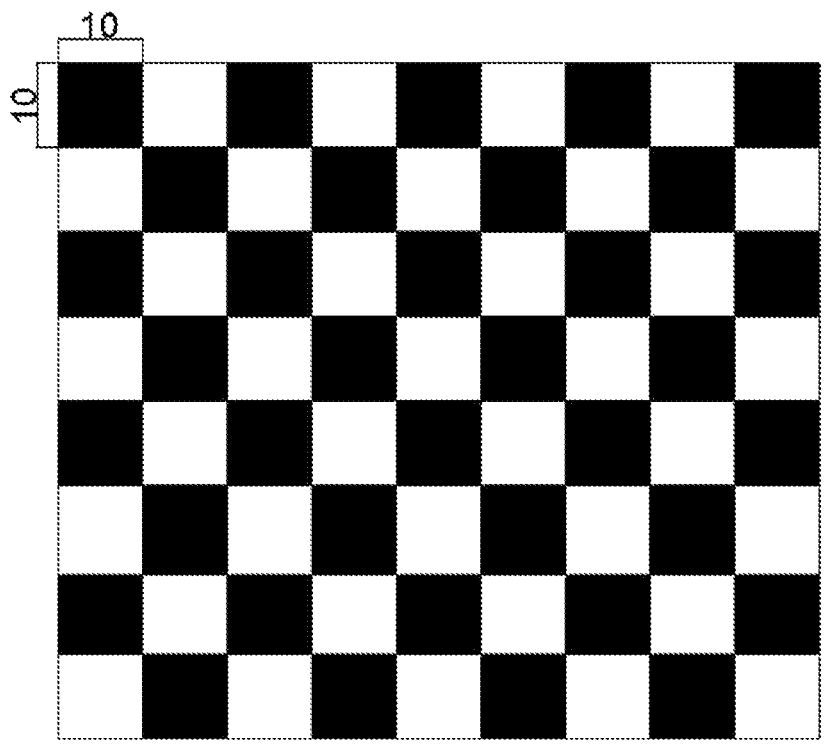
FIG. 5 is a first example diagram of a two-dimensional checkerboard according to an embodiment of this application.

The three-dimensional towered checkerboard consists of stacked polyhedrons to form a six-layer structure. The structure of each layer includes six polyhedrons, and an edge length of each polyhedron is 100 mm. Surfaces X of all the polyhedrons on the second layer from the bottom are covered with 9*8 two-dimensional checkerboards as shown in FIG. 5, and an edge length of each checkerboard is 10 mm. The area of the two-dimensional checkerboard is slightly smaller than that of any surface of the polyhedron.

Embodiment 2

Figure 6:
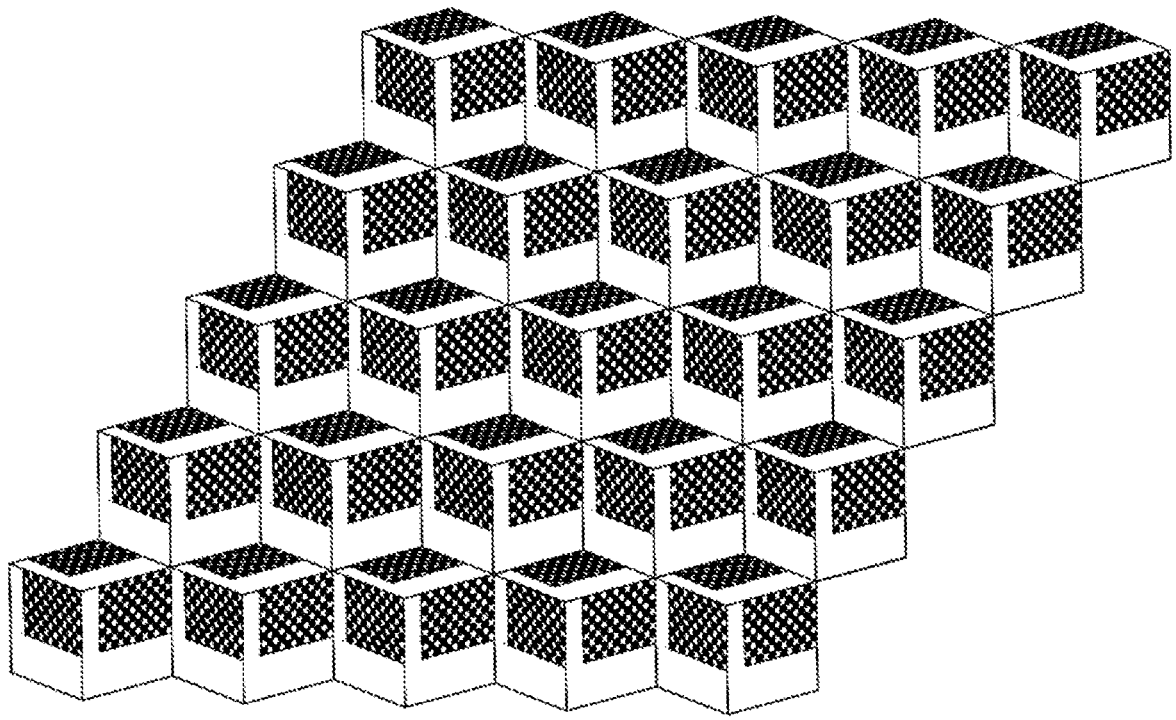
FIG. 6 is a second example diagram of a three-dimensional towered checkerboard according to an embodiment of this application.

FIG. 6 is a second example diagram of a three-dimensional towered checkerboard according to an embodiment of this application.

Figure 7:
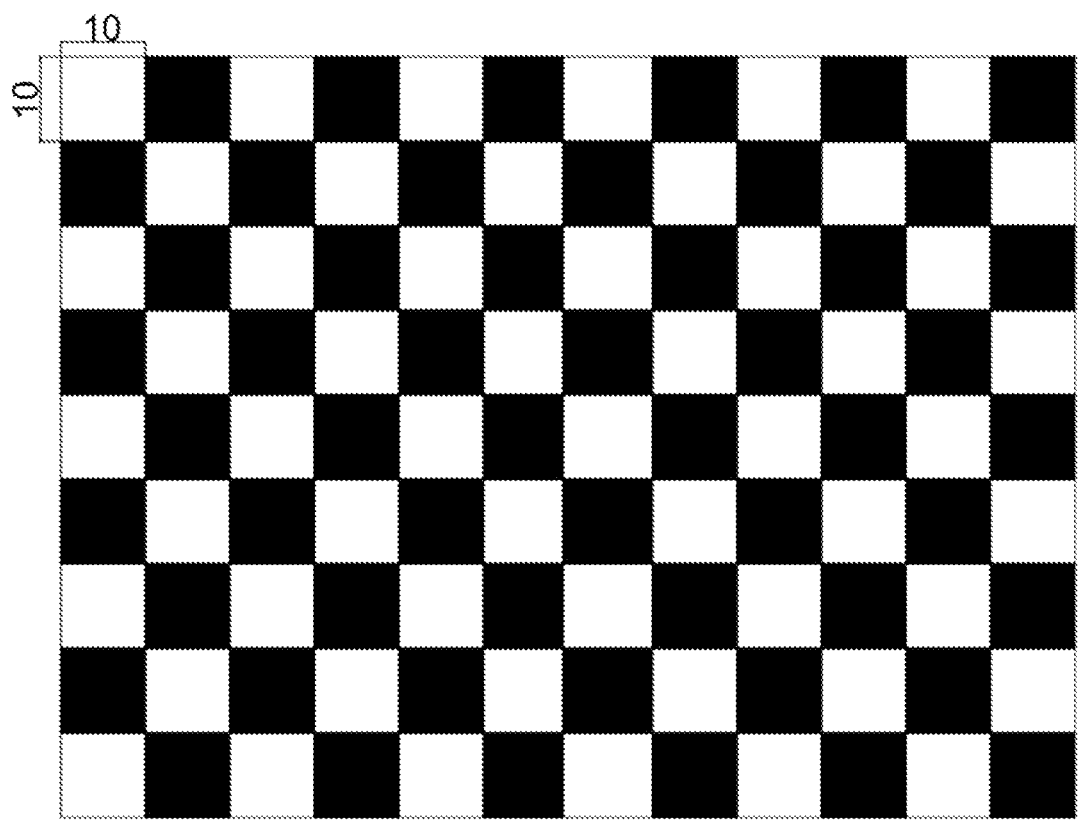
FIG. 7 is a second example diagram of a two-dimensional checkerboard according to an embodiment of this application.

The three-dimensional towered checkerboard consists of stacked polyhedrons to form a five-layer structure. The structure of each layer includes five polyhedrons, and an edge length of each polyhedron is 150 mm. Surfaces X, Y and Z of all the polyhedrons are covered with 12*9 two-dimensional checkerboards as shown in FIG. 7, and an edge length of each checkerboard is 10 mm. The area of the two-dimensional checkerboard is slightly smaller than that of any surface of the polyhedron.

Embodiment 3

Figure 8:
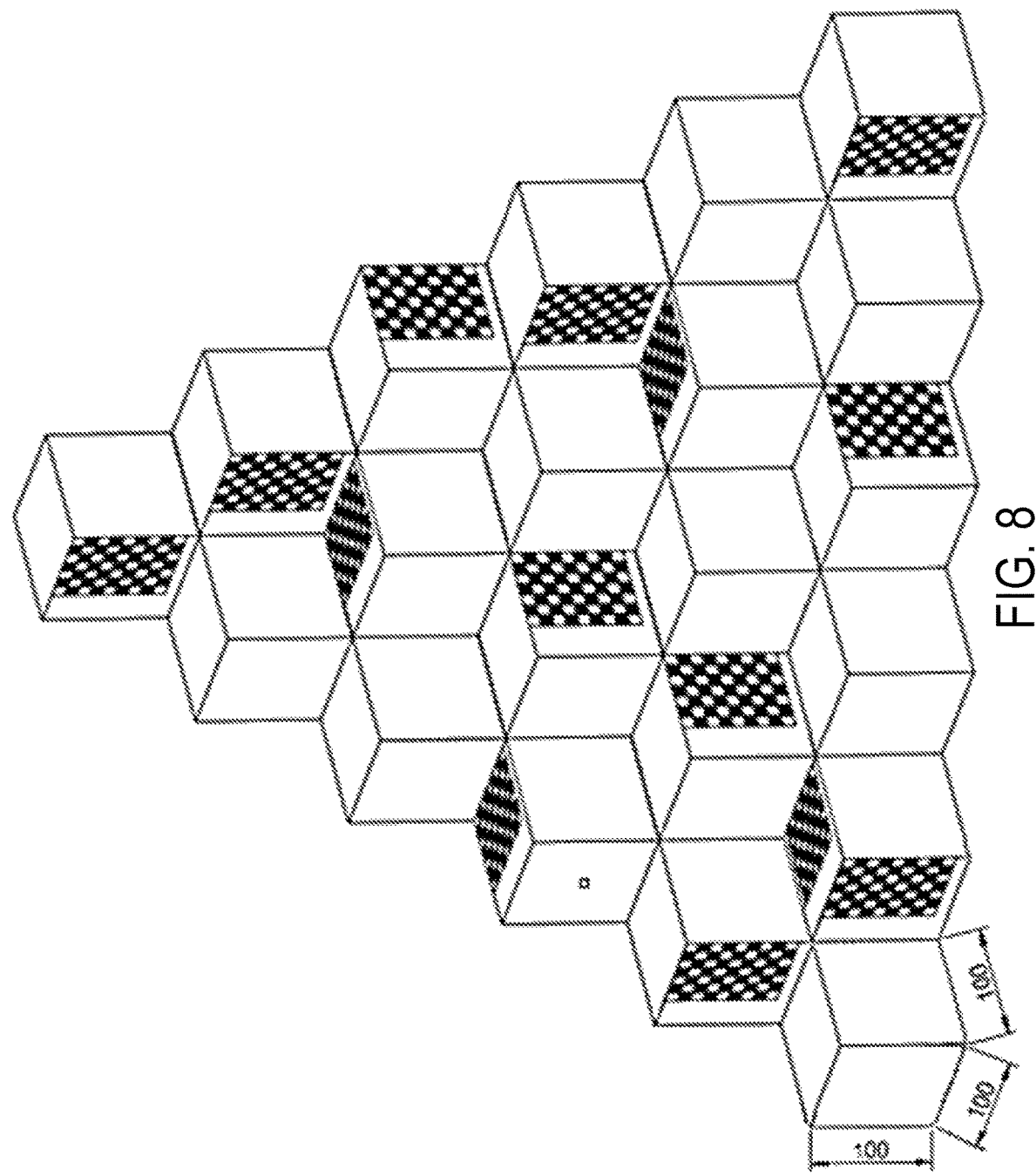
FIG. 8 is a third example diagram of a two-dimensional checkerboard according to an embodiment of this application.

FIG. 8 is a third example diagram of a three-dimensional towered checkerboard according to an embodiment of this application.

The three-dimensional towered checkerboard consists of stacked polyhedrons to form a six-layer structure. The structure of each layer includes one to six polyhedrons from top to bottom, and an edge length of each polyhedron is 100 mm. Surfaces X, Y or Z of a plurality of polyhedrons are covered with 9*8 two-dimensional checkerboards as shown in FIG. 5 according to a determined layout, and an edge length of each checkerboard is 10 mm. The area of the two-dimensional checkerboard is slightly smaller than that of any surface of the polyhedron.

In practical work, the number of layers of the three-dimensional towered checkerboard, the number of polyhedrons in each layer, the size of each polyhedron, the set positions of two-dimensional checkerboards, and the size of the two-dimensional checkerboards are adjusted according to needs.

This application designs a three-dimensional towered checkerboard, that is, n polyhedrons are designed in each layer, m layers are designed, and the layers are staggered. The number n of polyhedrons in each layer does not have to be the same, and two-dimensional checkerboards are attached to several fixed polyhedrons. This design converts the problem of planar point clouds perceived by a LiDAR into a three-dimensional point cloud problem. As corners of a three-dimensional point cloud have accurate uniqueness, they are matched with corners obtained by photographing the two-dimensional checkerboards via camera, so that extrinsic parameters for calibration of the camera and the LiDAR is accurately obtained. Due to large amounts of information carried by a multi-level tower structure and a plurality of two-dimensional checkerboard calibration plates, an extrinsic result can be accurately obtained by merely one photographing. The design saves time and efforts while accurately realizing joint calibration between a LiDAR and a camera.

Figure 9:
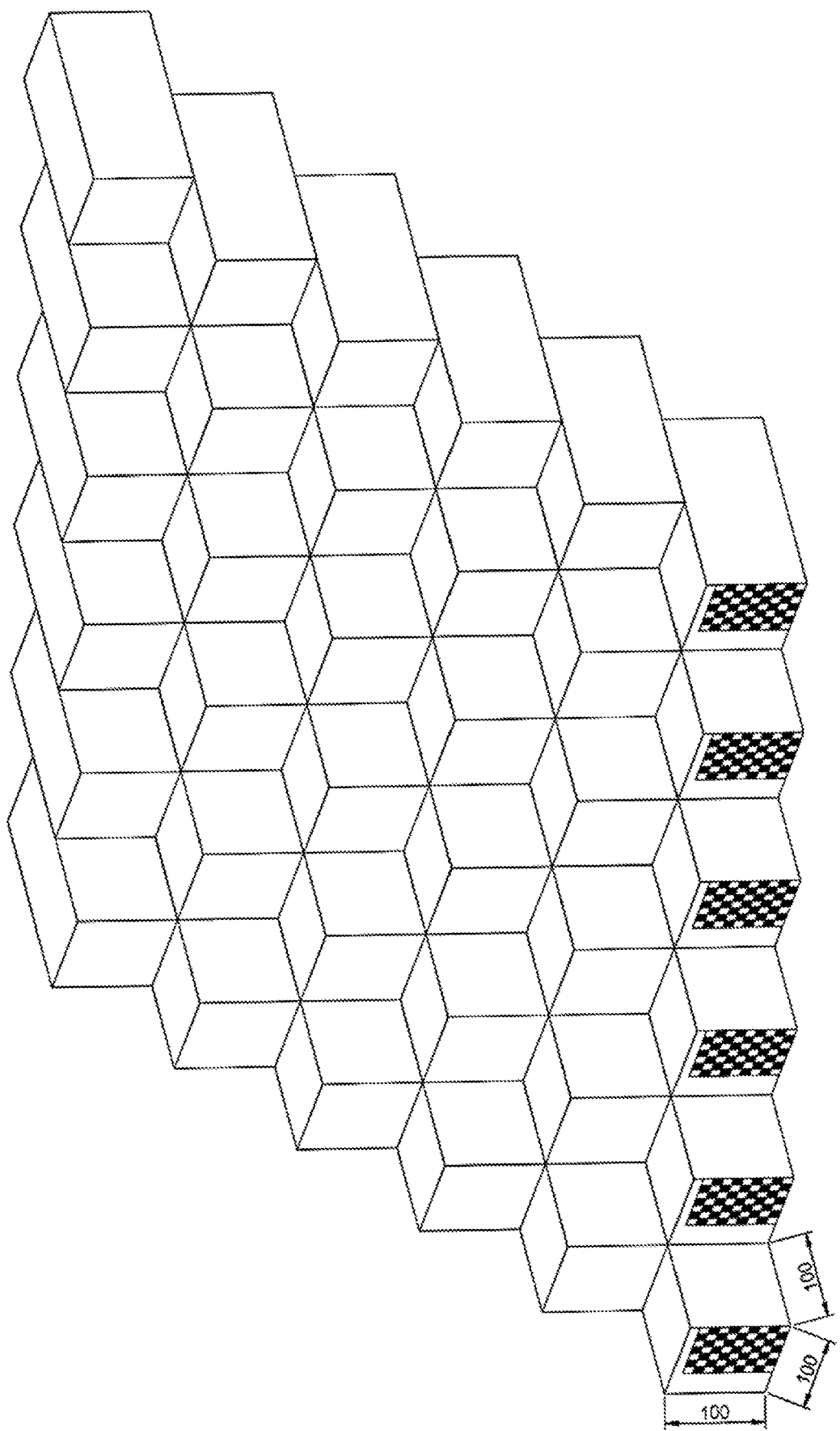
FIG. 9 is a schematic diagram of a three-dimensional towered checkerboard required to be used in an implementation process of a joint calibration method according to an embodiment of this application.

An embodiment of the present invention further provides a LiDAR and camera joint calibration method based on a three-dimensional towered checkerboard. A three-dimensional towered checkerboard required to be used in an implementation process of the joint calibration method adopts the three-dimensional towered checkerboard in the foregoing embodiments, as shown in FIG. 1 and FIG. 9.

Different from conventional two-dimensional checkerboards in the prior art, the checkerboard provided by the embodiment of this application is three-dimensional. FIG. 1 and FIG. 9 are schematic structural diagrams of a three-dimensional towered checkerboard according to embodiments of this application.

In an embodiment of this application, the three-dimensional towered checkerboard consists of a plurality of stacked cubes to form a multilayer structure, and the orientation of each cube is the same. Cubes in a same layer are staggered in a same direction by an edge length of one cube. Planes, having a uniform orientation, of a preset number of cubes are provided with two-dimensional checkerboards.

FIG. 3 is a schematic structural diagram of a two-dimensional checkerboard according to an embodiment of this application.

In an embodiment of this application, the number of two-dimensional checkerboards is less than or equal to that of cubes, and the two-dimensional checkerboards are black and white checkerboards. An edge length of the two-dimensional checkerboard is shorter than that of the cube.

Before the method provided by this application is implemented, the following preparation work is also required to be implemented.

An appropriate LiDAR and camera are selected, and positions of them are fixed on the positions suitable for photographing the three-dimensional towered checkerboard. Appropriate camera intrinsic and distortion parameters are selected. Finally, the three-dimensional towered checkerboard is arranged on an appropriate position, and the LiDAR and the camera are respectively used for acquiring information of the three-dimensional towered checkerboard.

Figure 10:
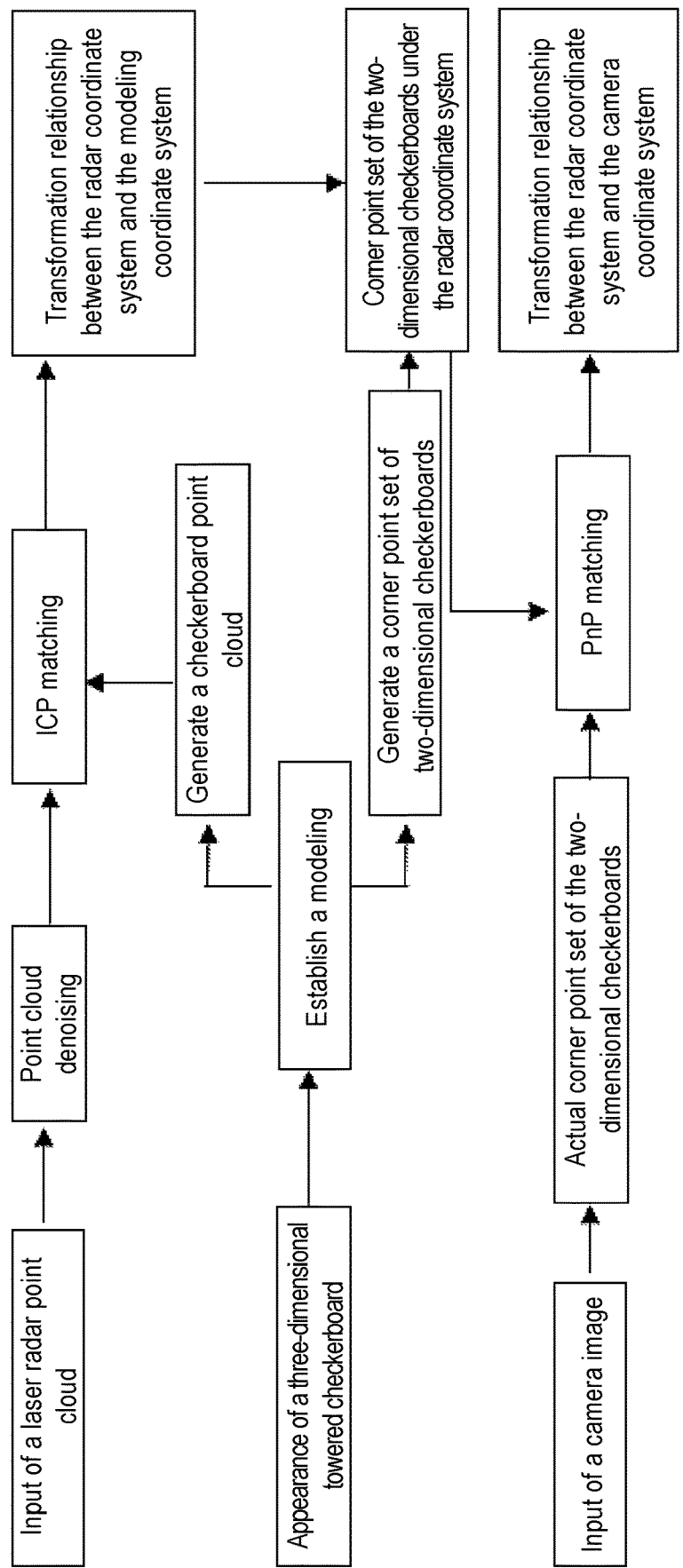
FIG. 10 is a simplified schematic flowchart of a joint calibration method according to an embodiment of this application.

FIG. 10 is a simplified schematic flowchart of a LiDAR and camera joint calibration method based on a three-dimensional towered checkerboard according to an embodiment of this application.

Figure 11:
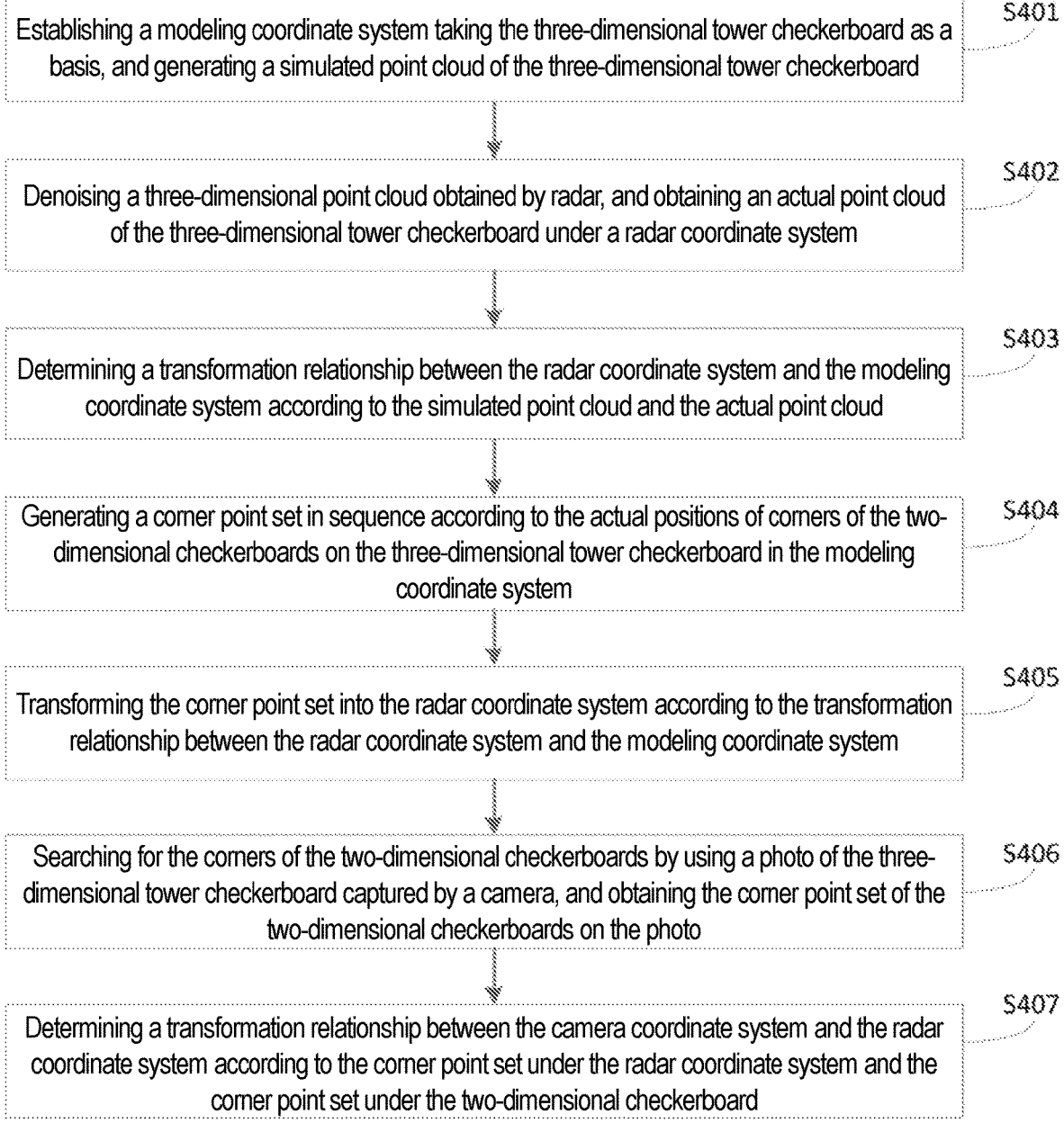
FIG. 11 is a schematic flowchart of a joint calibration method according to an embodiment of this application.

FIG. 11 is a schematic flowchart of a LiDAR and camera joint calibration method based on a three-dimensional towered checkerboard according to an embodiment of this application.

The method provided by this application includes the following steps:

At S401, a modeling coordinate system taking the three-dimensional towered checkerboard as a basis is established, and a simulated point cloud of the three-dimensional towered checkerboard is generated.

Specifically, by taking a bottom left protrusion of the three-dimensional towered checkerboard as an origin, along a distribution direction of the three-dimensional towered checkerboard, an x-axis, a y-axis and a z-axis are respectively established, to establish the modeling coordinate system.

The simulated point cloud of the three-dimensional towered checkerboard under the modeling coordinate system is generated according to structure information of the three-dimensional towered checkerboard, with a point spacing of the simulated point cloud being less than 1 mm.

Figure 12:
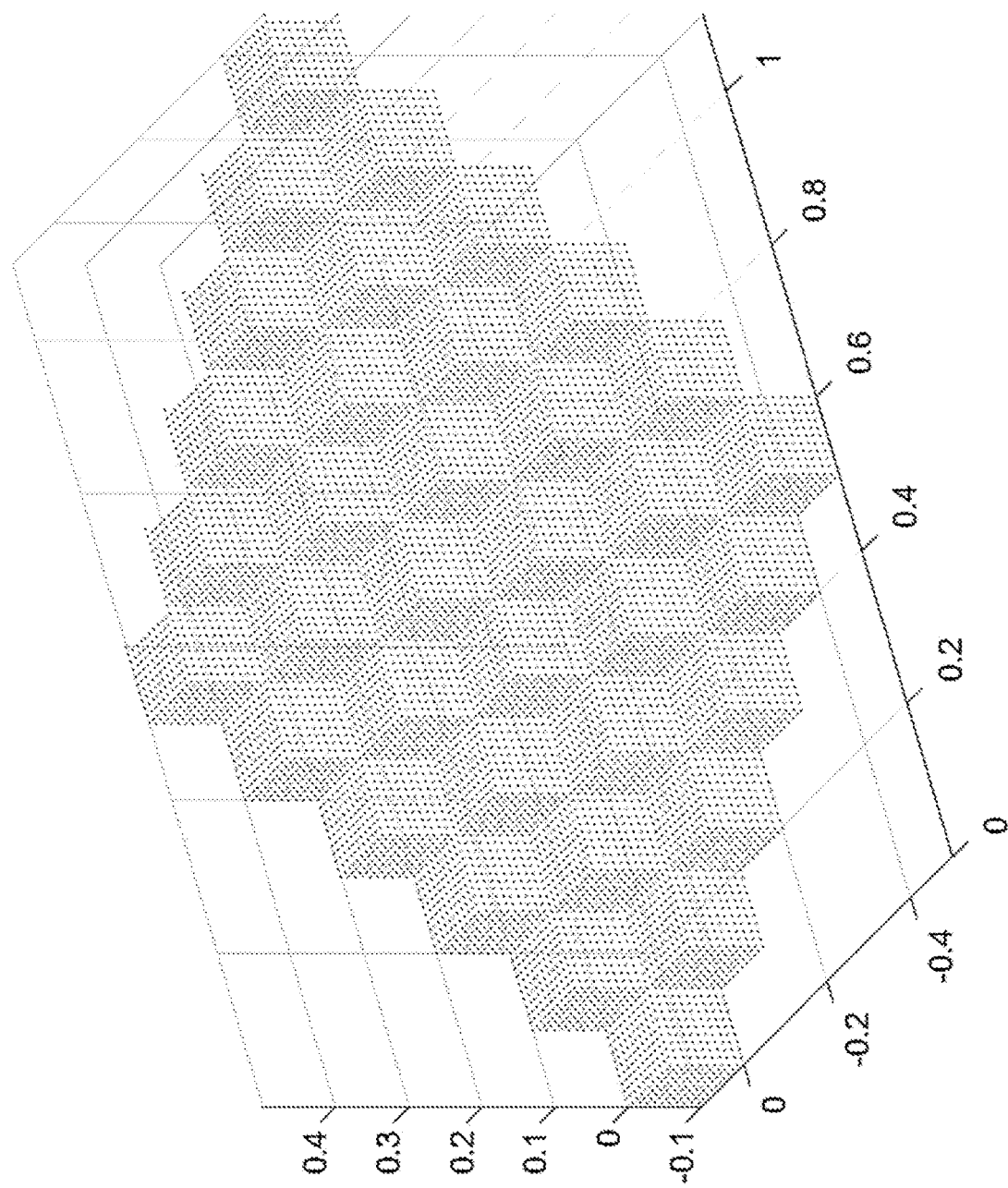
FIG. 12 is a schematic diagram of a simulated point cloud of a three-dimensional towered checkerboard under a modeling coordinate system according to an embodiment of this application.

FIG. 12 is a schematic diagram of a simulated point cloud of a three-dimensional towered checkerboard under a modeling coordinate system according to an embodiment of this application.

At S402, a three-dimensional point cloud obtained by LiDAR is denoised, and an actual point cloud of the three-dimensional towered checkerboard under a LiDAR coordinate system is obtained.

Specifically, points of the three-dimensional towered checkerboard on the ground and in an uncorrelated interval are removed according to an interval where the three-dimensional towered checkerboard is located.

The ground plane where the three-dimensional towered checkerboard is located is fitted, and all the points on the ground plane are removed; the ground plane is a plane having the largest number of points in a space of the three-dimensional towered checkerboard and having a normal vector which goes approximately vertically upward.

Due to limitations on LiDAR selection and scenes, a three-dimensional point cloud of the LiDAR necessarily covers a small amount of point noises which do not belong to the three-dimensional towered checkerboard. These point noises may come from the scene, or may come from echo multi-path interference of the LiDAR. Although these point noises may cause certain errors in the next matching, their proportion is relatively low.

The three-dimensional point cloud after all the points on the ground plane and in the uncorrelated interval are removed is taken as the actual point cloud of the three-dimensional towered checkerboard under the LiDAR coordinate system.

Figure 13:
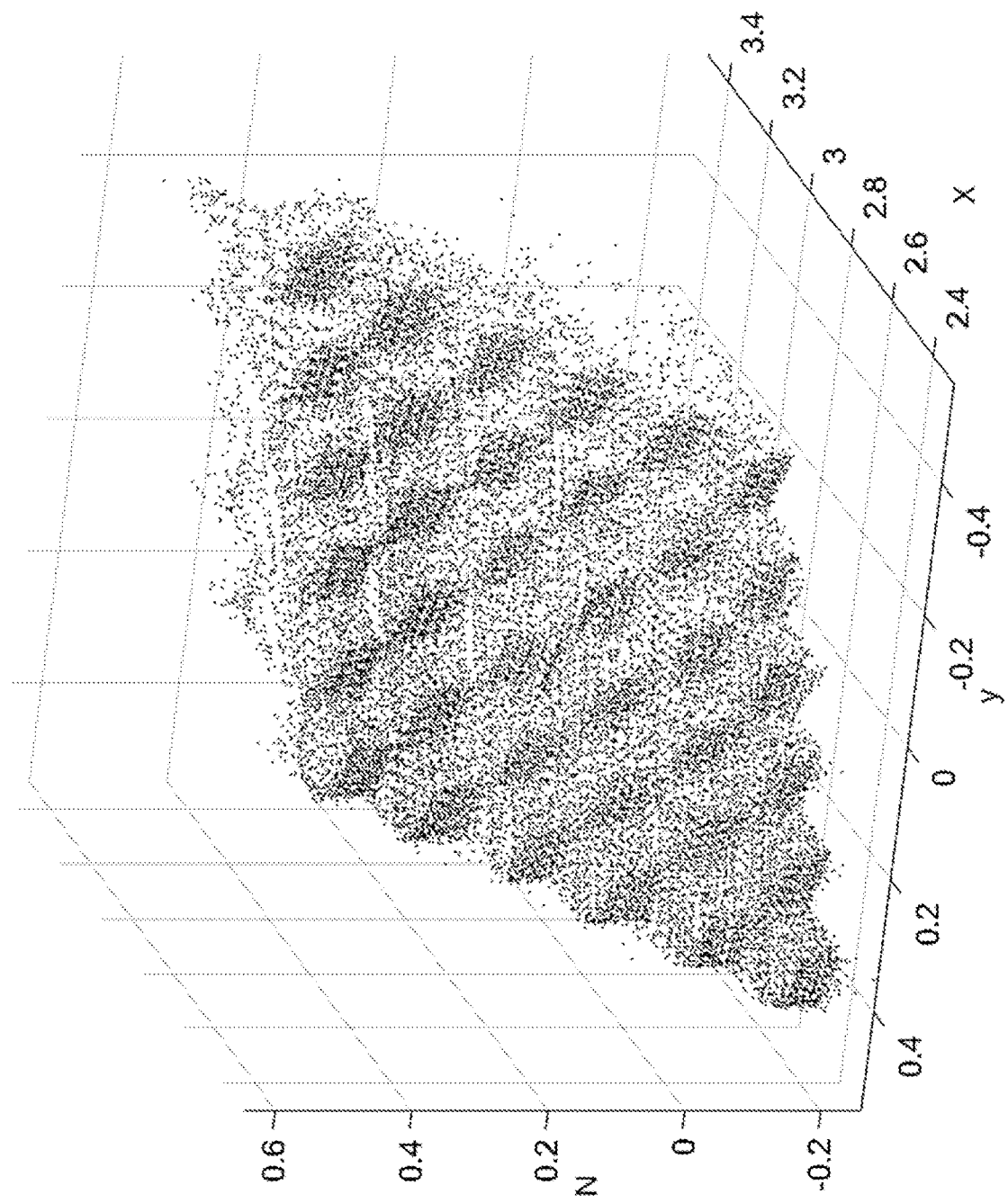
FIG. 13 is a schematic diagram of an actual point cloud of a three-dimensional towered checkerboard under a LiDAR coordinate system according to an embodiment of this application.

FIG. 13 is a schematic diagram of an actual point cloud of a three-dimensional towered checkerboard under a LiDAR coordinate system according to an embodiment of this application.

At S403, a transformation relationship between the LiDAR coordinate system and the modeling coordinate system is determined according to the simulated point cloud and the actual point cloud under the LiDAR coordinate system.

Specifically, by using an iterative closest point algorithm, three-dimensional point cloud registration is performed on the point cloud and the point cloud of the three-dimensional towered checkerboard under the LiDAR coordinate system, and the transformation relationship between the LiDAR coordinate system and the modeling coordinate system is determined.

At S404, a corner point set is generated in sequence according to the actual positions of corners of the two-dimensional checkerboards on the three-dimensional towered checkerboard in the modeling coordinate system.

Figure 14:
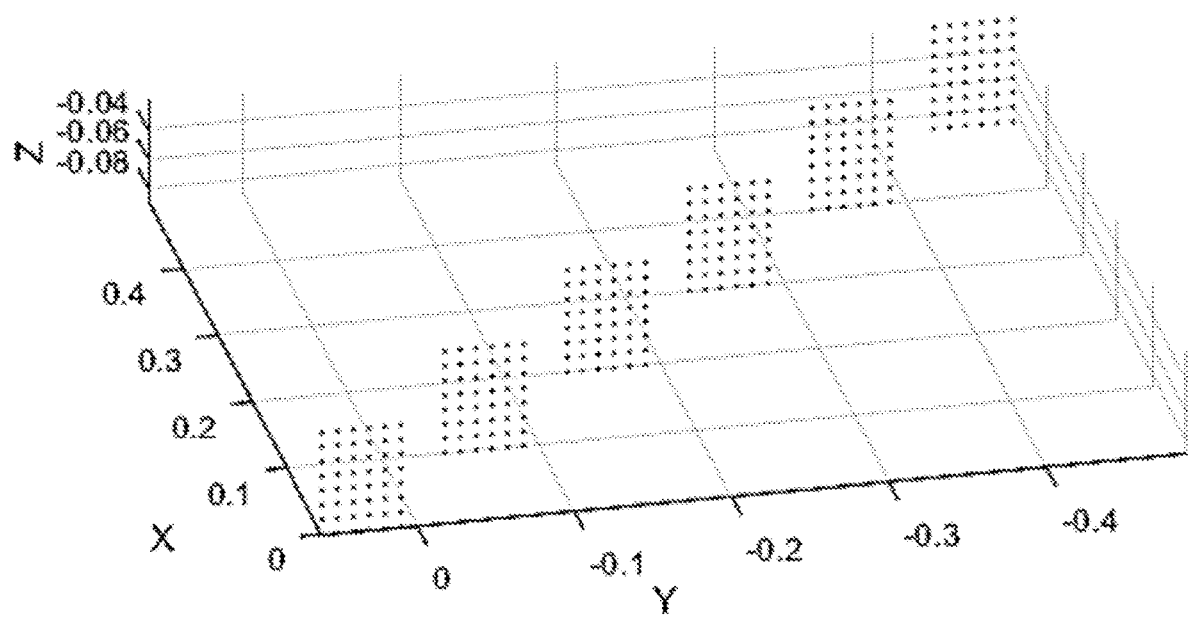
FIG. 14 is a schematic diagram of three-dimensional coordinates of corners of a two-dimensional checkerboard under a modeling coordinate system according to an embodiment of this application.

FIG. 14 is a schematic diagram of three-dimensional coordinates of corners of a two-dimensional checkerboard under a modeling coordinate system according to an embodiment of this application.

Specifically, the two-dimensional checkerboards are numbered according to a predetermined sequence. The numbering mode may be two-dimensional checkerboard 1 to two-dimensional checkerboard n.

The corner point set is generated on the basis of the serial numbers, in a sequence from smallest to largest, and according to the predetermined sequence.

In an embodiment of this application, the predetermined sequence may be from left to right and from top to bottom.

At S405, the corner point set is transformed into the LiDAR coordinate system according to the transformation relationship between the LiDAR coordinate system and the modeling coordinate system.

Specifically, a calculation method for the corner point set under the LiDAR coordinate system is as follows:

$$S_L = F_{L-M} * S_M$$

in the equation, $S_L$ is the corner point set under the LiDAR coordinate system, $F_{L-M}$ is the transformation relationship between the LiDAR coordinate system and the modeling coordinate system, and $S_M$ is the corner point set generated under the modeling coordinate system.

At S406, the corners of the two-dimensional checkerboards are searched for by using a photo of the three-dimensional towered checkerboard captured by a camera, and the corner point set of the two-dimensional checkerboards on the photo is obtained.

Figure 15:
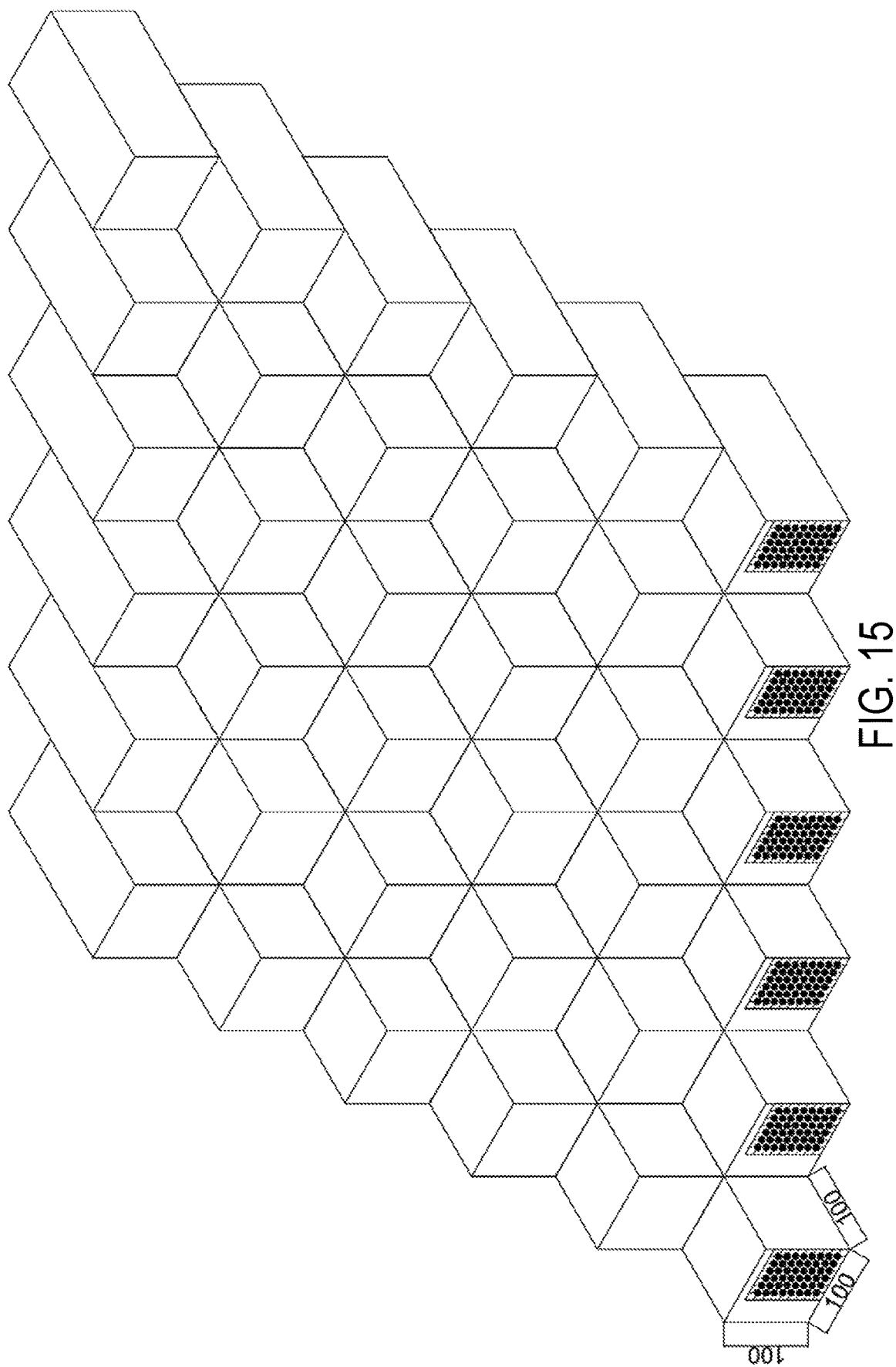
FIG. 15 is a schematic diagram of corners of a two-dimensional checkerboard captured by a camera according to an embodiment of this application.

FIG. 15 is a schematic diagram of corners of a two-dimensional checkerboard captured by a camera according to an embodiment of this application.

Specifically, target checkerboard areas having consistent lengths and widths as the two-dimensional checkerboards are sequentially obtained from the photo of the three-dimensional towered checkerboard.

Every time a group of target checkerboard areas is obtained, the target checkerboard areas are set black until the photo of the three-dimensional towered checkerboard does not contain the target checkerboard area.

The checkerboard corners in all the target checkerboard areas are arranged from left to right and from top to bottom, to obtain the corner point set of the two-dimensional checkerboards on the photo.

At S407, a transformation relationship between the camera coordinate system and the LiDAR coordinate system is determined according to the corner point set under the LiDAR coordinate system and the corner point set under the two-dimensional checkerboard.

The transformation relationship between the camera coordinate system and the LiDAR coordinate system is a joint calibration result. Specifically, by using a perspective-n-point positioning method, camera pose measurement and matching are performed on the corner point set under the LiDAR coordinate system and the corner point set obtained from the photo, and according to camera intrinsic and distortion parameters, the transformation relationship between the camera coordinate system and the LiDAR coordinate system, i.e., the joint calibration result, is determined.

On the basis of stereospecificity of the three-dimensional towered checkerboard, this application solves the problem of inaccuracy of matching of a planar point cloud obtained by a LiDAR when conventional two-dimensional checkerboards are used, and also solves the problem of complicated manual operations caused by a plurality of image frames in a conventional method. This application accurately obtains an extrinsic matrix between a LiDAR and a camera by two transformation relationships between coordinate systems.

This application can obtain a high-precision extrinsic matrix between a LiDAR and a camera by merely one photographing on the basis of the stereospecificity of a three-dimensional towered checkerboard, the positions of two-dimensional checkerboards on the three-dimensional towered checkerboard, and calculation of transformation relationships between three coordinate systems.

A person skilled in the art can clearly understand that the technology in the embodiments of this application can be implemented by means of software plus a necessary general hardware platform. Based on such an understanding, the technical solutions in the embodiments of this application essentially, or a part contributing to the prior art may be implemented in a form of a software product. The computer software product is stored in a storage medium, such as a ROM/RAM, a floppy disk, or a compact disc, and includes several instructions for instructing one computer device (which may be a personal computer, a server, a network device or the like) to perform the method in embodiments or some portions of the embodiments of this application.

The same and similar parts between the embodiments in the description may be referred to each other. Particularly, as embodiments of a service construction device and a service loading device are substantially similar to embodiments of the method, the embodiments of the devices are described relatively briefly, and the related parts can be found with reference to the description of the embodiments of the method.

The foregoing implementations of this application are not intended to limit the protection scope of this application.

What is claimed is:

1. A LiDAR and camera joint calibration method based on a three-dimensional towered checkerboard, wherein the method is based on the three-dimensional towered checkerboard, the three-dimensional towered checkerboard is a multilayer structure formed by stacking a plurality of cubes, and an orientation of each of the cubes are the same; planes, having a uniform orientation, of the cubes on each of layers are provided with two-dimensional checkerboards; an edge length of the two-dimensional checkerboards is less than an edge length of the cubes; and the method comprises:
establishing a modeling coordinate system taking the three-dimensional towered checkerboard as a basis, and generating a simulated point cloud of the three-dimensional towered checkerboard;

denoising a three-dimensional point cloud obtained by LiDAR, and obtaining an actual point cloud of the three-dimensional towered checkerboard under a LiDAR coordinate system;

determining a transformation relationship between the LiDAR coordinate system and the modeling coordinate system according to the simulated point cloud and the actual point cloud;

generating a corner point set in sequence according to actual positions of corners of the two-dimensional checkerboards on the three-dimensional towered checkerboard in the modeling coordinate system;

transforming the corner point set into the LiDAR coordinate system according to the transformation relationship between the LiDAR coordinate system and the modeling coordinate system;

searching for the corners of the two-dimensional checkerboards by using a photo of the three-dimensional towered checkerboard captured by a camera, and obtaining the corner point set of the two-dimensional checkerboards on the photo; and determining a transformation relationship between a camera coordinate system and the LiDAR coordinate system according to the corner point set under the LiDAR coordinate system and the corner point set under the two-dimensional checkerboard; the transformation relationship between the camera coordinate system and the LiDAR coordinate system being a joint calibration result.

2. The method according to claim 1, wherein the establishing the modeling coordinate system taking the three-dimensional towered checkerboard as a basis, and generating the simulated point cloud of the three-dimensional towered checkerboard comprises:

by taking a bottom left protrusion of the three-dimensional towered checkerboard as an origin, along a distribution direction of the three-dimensional towered checkerboard, respectively establishing an x-axis, a y-axis and a z-axis, to establish the modeling coordinate system; and generating the simulated point cloud of the three-dimensional towered checkerboard under the modeling coordinate system according to structure information of the three-dimensional towered checkerboard, with a point spacing of the simulated point cloud being less than 1 mm.

3. The method according to claim 1, wherein the denoising the three-dimensional point cloud obtained by the LiDAR, and obtaining the actual point cloud of the three-dimensional towered checkerboard under the LiDAR coordinate system comprises:
  removing points of the three-dimensional towered checkerboard on a ground and in an uncorrelated interval according to an interval where the three-dimensional towered checkerboard is located;
  fitting a ground plane where the three-dimensional towered checkerboard is located, and removing all the points on the ground plane; the ground plane is a plane having the largest number of points in a space of the three-dimensional towered checkerboard and having a normal vector which goes approximately vertically upward; and
  taking the three-dimensional point cloud after all the points on the ground plane and in the uncorrelated interval are removed as the actual point cloud of the three-dimensional towered checkerboard under the LiDAR coordinate system.

4. The method according to claim 1, wherein the determining the transformation relationship between the LiDAR coordinate system and the modeling coordinate system according to the simulated point cloud and the actual point cloud comprises:
  performing, by using an iterative closest point algorithm, three-dimensional point cloud registration on the simulated point cloud generated under the modeling coordinate system and the actual point cloud of the three-dimensional towered checkerboard under the LiDAR coordinate system, and determining the transformation relationship between the LiDAR coordinate system and the modeling coordinate system.

5. The method according to claim 1, wherein the generating the corner point set in sequence according to the actual positions of the corners of the two-dimensional checkerboards on the three-dimensional towered checkerboard in the modeling coordinate system comprises:
  numbering the two-dimensional checkerboards according to a predetermined sequence; and
  generating the corner point set on the basis of serial numbers, in a sequence from smallest to largest, and according to the predetermined sequence.

6. The method according to claim 1, wherein the transforming the corner point set into the LiDAR coordinate system according to the transformation relationship between the LiDAR coordinate system and the modeling coordinate system comprises:
  a calculation method for the corner point set under the LiDAR coordinate system:

$$S_L = F_{L-M} * S_M$$

in the equation, $S_L$ is the corner point set under the LiDAR coordinate system, $F_{L-M}$ is the transformation relationship between the LiDAR coordinate system and the modeling coordinate system, and $S_M$ is the corner point set generated under the modeling coordinate system.

7. The method according to claim 1, wherein the searching for the corners of the two-dimensional checkerboards by using a photo of the three-dimensional towered checkerboard captured by a camera, and obtaining the corner point set of the two-dimensional checkerboards on the photo comprises:
  sequentially obtaining target checkerboard areas having consistent lengths and widths as the two-dimensional checkerboards from the photo of the three-dimensional towered checkerboard;
  every time a group of the target checkerboard areas is obtained, setting the target checkerboard areas black until the photo of the three-dimensional towered checkerboard does not contain the target checkerboard areas; and
  arranging checkerboard corners in all the target checkerboard areas from left to right and from top to bottom, to obtain the corner point set of the two-dimensional checkerboards on the photo.

8. The method according to claim 1, wherein the determining a transformation relationship between the camera coordinate system and the LiDAR coordinate system according to the corner point set under the LiDAR coordinate system and the corner point set under the two-dimensional checkerboard comprises:
  performing, by using a perspective-n-point positioning method, camera pose measurement and matching on the corner point set under the LiDAR coordinate system and the corner point set obtained from the photo, and according to camera intrinsic and distortion parameters, determining the transformation relationship between the camera coordinate system and the LiDAR coordinate system.

* * * * *